INVENTORS:
WILLIAM R. HOOK,
ROLAND H. DISHINGTON,
BY
ATTORNEY.

INVENTORS:
WILLIAM R. HOOK,
ROLAND H. DISHINGTON,
BY
ATTORNEY.

INVENTORS:
WILLIAM R. HOOK,
ROLAND H. DISHINGTON,
BY
[signature]
ATTORNEY.

Sept. 8, 1970 W. R. HOOK ET AL 3,527,533

METHOD AND APPARATUS FOR DERIVING AND PROCESSING TOPOGRAPHICAL INFORMATION

Filed Aug. 25, 1964 7 Sheets-Sheet 4

INVENTORS:
WILLIAM R. HOOK,
ROLAND H. DISHINGTON,
BY
ATTORNEY.

Sept. 8, 1970 W. R. HOOK ET AL 3,527,533
METHOD AND APPARATUS FOR DERIVING AND PROCESSING TOPOGRAPHICAL INFORMATION
Filed Aug. 25, 1964 7 Sheets-Sheet 5
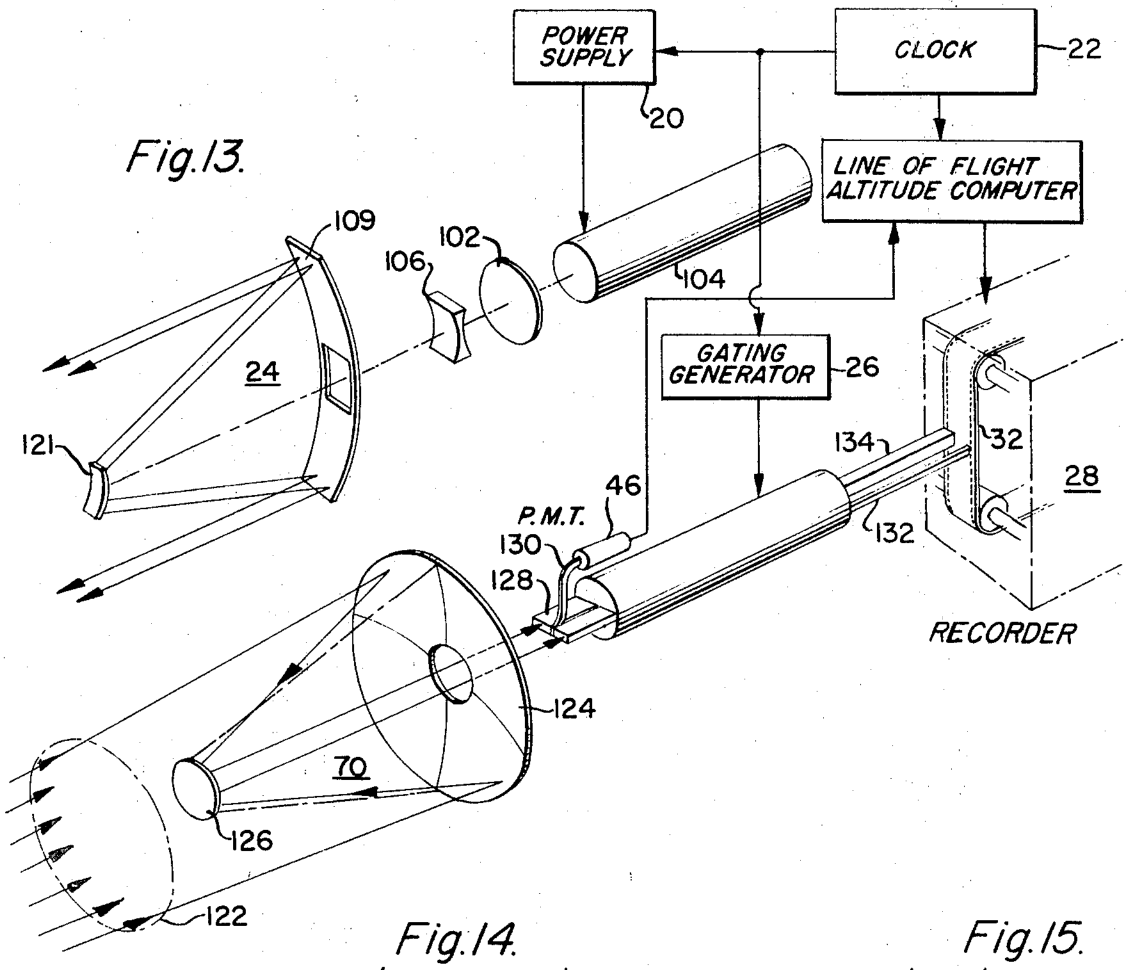
Fig.14.
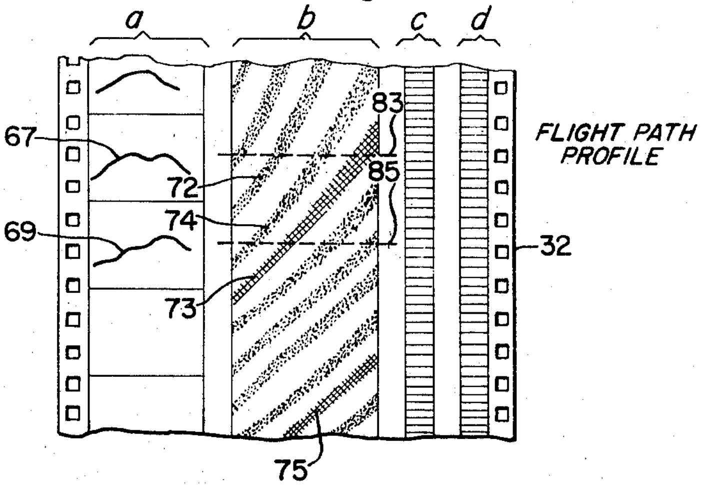
Fig.15.
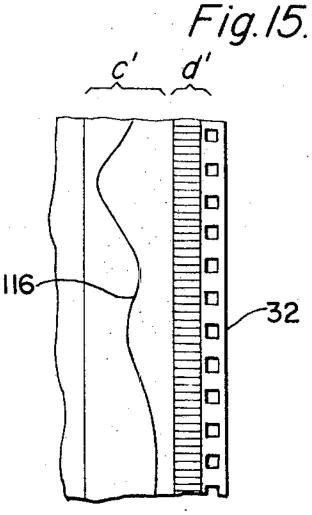
INVENTORS:
WILLIAM R. HOOK,
ROLAND H. DISHINGTON,
BY
Benjamin DeWitt
ATTORNEY

INVENTORS:
WILLIAM R. HOOK,
ROLAND H. DISHINGTON,
BY
ATTORNEY.

INVENTORS:
WILLIAM R. HOOK,
ROLAND H. DISHINGTON,
BY
Benjamin A. [signature]
ATTORNEY.

United States Patent Office 3,527,533

Patented Sept. 8, 1970

3,527,533

METHOD AND APPARATUS FOR DERIVING AND PROCESSING TOPOGRAPHICAL INFORMATION

William R. Hook, Los Angeles, and Roland H. Dishington, Pacific Palisades, Calif., assignors to TRW Inc., Redondo Beach, Calif., a corporation of Ohio Filed Aug. 25, 1964, Ser. No. 391,958
Int. Cl. G01c *3/08;* G03b *29/00*
U.S. Cl. 356—5 15 Claims

ABSTRACT OF THE DISCLOSURE

A method of topographical surveying from an airborne vehicle whereby optical frequency radiation pulses of varying short time duration are propagated toward the surface to be surveyed in a manner to time successively illuminate a plurality of successive areas of said surface, with each pulse illuminating an area at least several times larger than the spacing between different points with respect to which it is desired to obtain differential elevational information. When said radiation pulses arive at said surface, the radiation is reflected at different times depending on the relative elevations, with the highest surface being the first to reflect a "return pulse." A receiver system then collects the reflected radiation from each elevation in an incremental manner whereby a contour map or some other form of readout is produced.

This invention relates to improvements in the measurement of distance, range or altitude and more particularly to an improved method and system, employing optical-frequency-electromagnetic radiation for deriving and processing topographical information, and in which there is achieved a substantial improvement in the rate at which such data is gathered, processed and/or stored for subsequent use.

In the prior art, the conventional method of generating topographical maps and contour representations of terrain has involved flying an aircraft over the selected terrain and photographing each section of the terrain from at least two different points along the flight line to produce a pair of stereo photographs of each section. Conventionally, contour maps are plotted from such photographs by mounting a pair of photographs in an apparatus commonly known as a Kelsh-type stereo-plotter. Such apparatus normally includes suitable projetcors for projecting a pair of stereo diapositives on a plane surface plotting table. The reduction of information from a pair of photographs by the use of Kelsh-type plotting apparatus is conventionally done manually and is an extremely complicated and tedious data reduction process generally requiring at least several hours to plot the contour lines from a single pair of photographs. While various automatic systems which dispense with the human element to a greater or lesser extent have been developed, even such systems have the disadvantages of requiring precision alignment of a variety of optical components while providing limited elevational accuracy at higher altitudes. To applicants' knowledge, all such prior systems have involved the use of stereo photography and subsequent reduction of the stereo photographs to topographic maps by the use of an apparatus completely separate from that which is carried in the aircraft. For many purposes such prior art procedures have the great disadvantage of entailing a time lapse of several days between the aerial traverse of the terrain and the finished production of the contour maps.

Accordingly, it is a principal object of the present invention to provide a method and system, employing space domain parallel processing, for simultaneously determining the distances between an information processing apparatus and a plurality of differently distanced objects or between the information processing apparatus and an array of incremental terrain areas having different elevations.

It is another object of the invention to provide an improved airborne or satellite carried reconnaissance system for remote measurement of terrain irregularities.

It is an additional object of the invention to provide an improved topographic mapping method and system in which contour maps are plotted, in real time, in a manner obviating the disadvantage of having a long time lapse between the traversal of a terrain and subsequent format.

It is a further object of the invention to provide such a method and system employing a fan-shaped beam of pulsatory optical frequency radiation.

It is a more general object of the invention to provide a method and system for generation of topographical maps which overcomes the aforementioned disadvantages of conventional topographical methods and systems.

While the method and apparatus of the present invention are contemplated as having application in various arts, such as optical radar echo ranging, vehicle collision avoidance, space vehicle orbital rendezvous and the like, they have particular utility in connection with topographical mapping of terrain irregularities of bodies such as the earth and the moon. For convenience the invention is hereafter described with reference to specific apparatus which has been found suitable for airborne or spaceborne contour mapping in real time of a remote terrain. It is, of course, to be expressly understood that the invention has broad application in various arts other than contour mapping, and its application is not to be restricted to any particular arts or purposes.

Briefly described, applicants' topographical surveying method involves flying a vehicle along a predetermined traverse over a terrain which is to be mapped. During such flight, a plurality of optical frequency radiation pulses of very short time duration are propagated toward the terrain in a manner to time successively illuminate a plurality of geographically successive portions of the terrain. The terrain is not illuminated point by point after the manner of a conventional flying spot scanner; rather each pulse illuminates an area at least several times larger than the spacing between different points with respect to which it is desired to obtain differential elevational information. That is, at least one dimension of the area illuminated by a given pulse is relatively very large in comparison to the smallest distance between incremental terrain areas which are to be elevationally differentiated. In one specific embodiment each successive pulse illuminates a different elongated strip portion extending substantially normal to the line of flight of the vehicle. The light reflected from the different incremental areas or subportions of each elongated strip is collected by optical means carried within the vehicle and is continuously converted into a time varying two-dimensional, space-domain image by means of an image converter tube or other image translating device. As a given radiation pulse arrives at the terrain, the radiation is reflected by different incremental terrain areas at different times depending on the relative elevations, with the highest terrain increment being the first to reflect a "return pulse" and the successively lower terrain increments reflecting the radiation at correspondingly later times. Thus, the image receiving portion of the system "sees" a two-dimensional image which varies as a function of time. Incremental areas of the image corresponding to the highest terrain increments have a maximum radiation flux density at a first time and a much lower (substantially zero) flux density at a second time a few nano-seconds later. Conversely, those areal increments of the image which correspond to portions of the terrain having a lower elevation necessarily exhibit zero flux density at the abovementioned first time and a high flux density at a later time. In accordance with the invention the time varying image at the receiver is repetitively sampled (or subdivided in the time domain) to provide a series of time-spaced partial images each of which is a time-domain increment of the time varying radiation "picture" of the terrain. It is important to observe that any given partial image of that series has a unique two-dimensional energy distribution, different from that of any other partial image, and specifically representative of those parts of the illuminated terrain which have an elevation corresponding to the time coordinate of that particular partial image. In other words, each partial image is a "picture" of the terrain area which coincides with a single contour line of a contour map of the illuminated terrain. In accordance with the invention every second or third one of the partial images, chronologically, is preserved and recorded. The rest are discarded or destroyed, for example, by periodic shuttering of the incoming radiation. The preserved partial images are then brought together (or integrated over a preselected time interval) to form a single image which includes a plurality of different contour representative partial images. This single image or record is, in effect, a contour map of terrain illuminated by a given transmitter output pulse. Preferably, the gating intervals are time-spaced so that the preserved images correspond to terrain portions having certain preselected elevation values or elevation bands, while the discarded images are those which would be representative of terrain portions having elevation values interstitially intermediate to the preselected elevation bands. The preserved partial images are conveyed through the image translating device to form visible light images which are photographed or otherwise converted to permanent (or semi-permanent) "contour-map" displays of information concerning the elevational characteristics of the terrain. For example, by continuously photographing or otherwise recording the composite image which appears at the output screen of a gated image converter tube, a contour map of the terrain is produced. Additionally, the same apparatus is periodically operated in a second mode to generate a profile of the traversed terrain in a plane normal to the line of flight. Further, a specific form of the apparatus optionally can be operated in a manner to periodically measure (and record in digital form) the line-of-sight distances from the vehicle to the traversed terrain to thereby produce a record of the profile along the path of flight.

The foregoing and other purposes and objects of the present invention will be more clearly apparent from the following description taken with the accompanying drawings, throughout which like reference characters indicate like reference parts, which drawings form a part of this application and in which:

FIG. 13 is a diagrammatic perspective illustration of a system including the subsystem components illustrated in FIGS. 7 through 12;

FIG. 14 is a plan view of a portion of a composite photographic topographical record produced by the method and apparatus of the invention;

FIG. 15 is a partial plan view of a composite photographic record produced by apparatus in accordance with a further embodiment;

Figures 1, 4, 5:
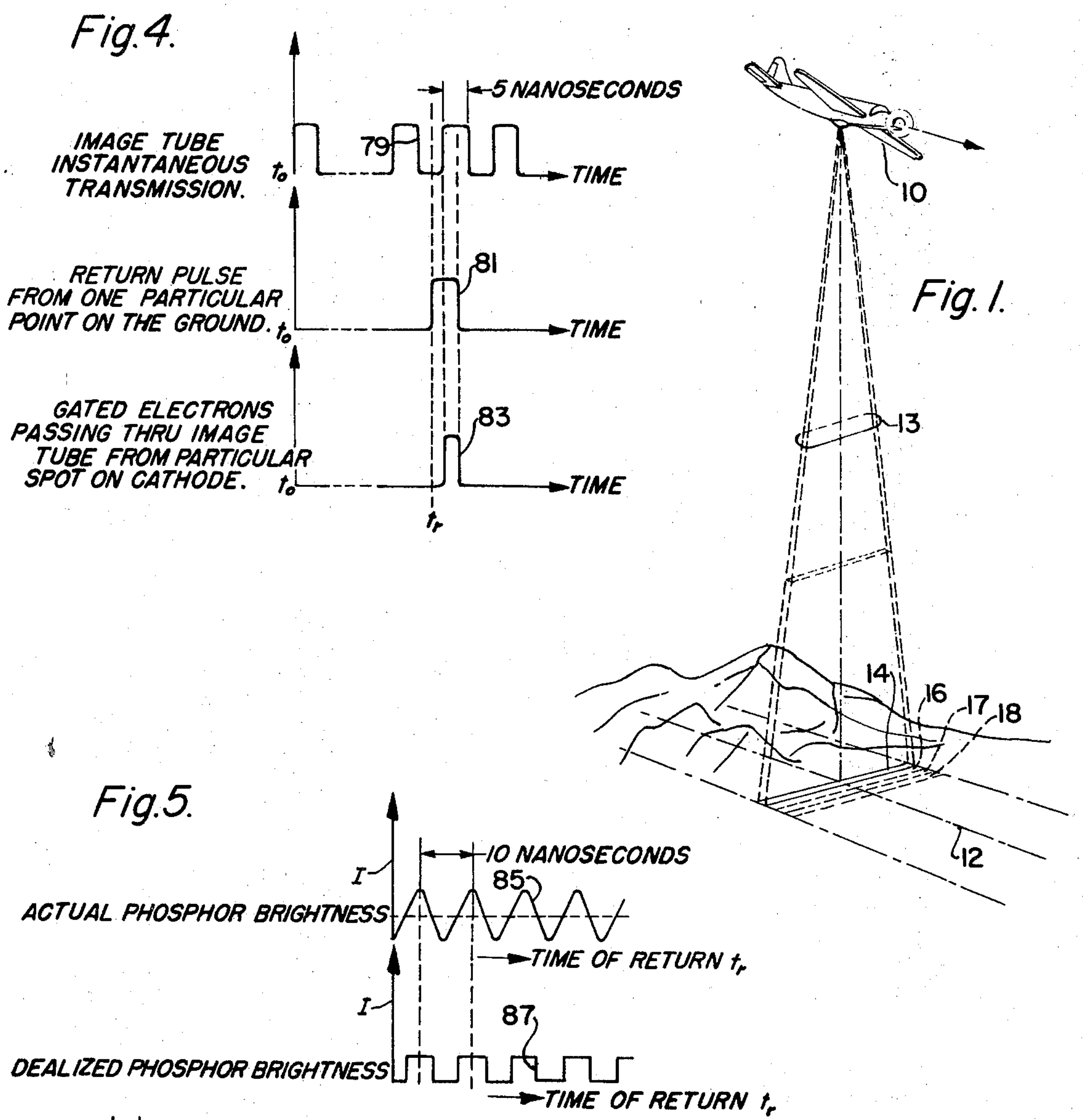
FIG. 1 is a perspective view illustrating the illumination of successive areas of a terrain by means of a vehicle travelling along a predetermined flight path above the terrain.
FIGS. 4, 5 and 6 are waveform diagrams useful in explaining the operation of the system illustrated in FIG. 2.

Referring first FIG. 1, there is shown a vehicle 10 which carries an apparatus therein for deriving and processing topographical information concerning the terrain over which the vehicle 10 flies. The vehicle 10, which preferably is an airplane or alternatively may be a low altitude satellite, preferably traverses the terrain to be surveyed in a straight line along a flight path indicated by the dashed center line 12.

Figures 2, 3:
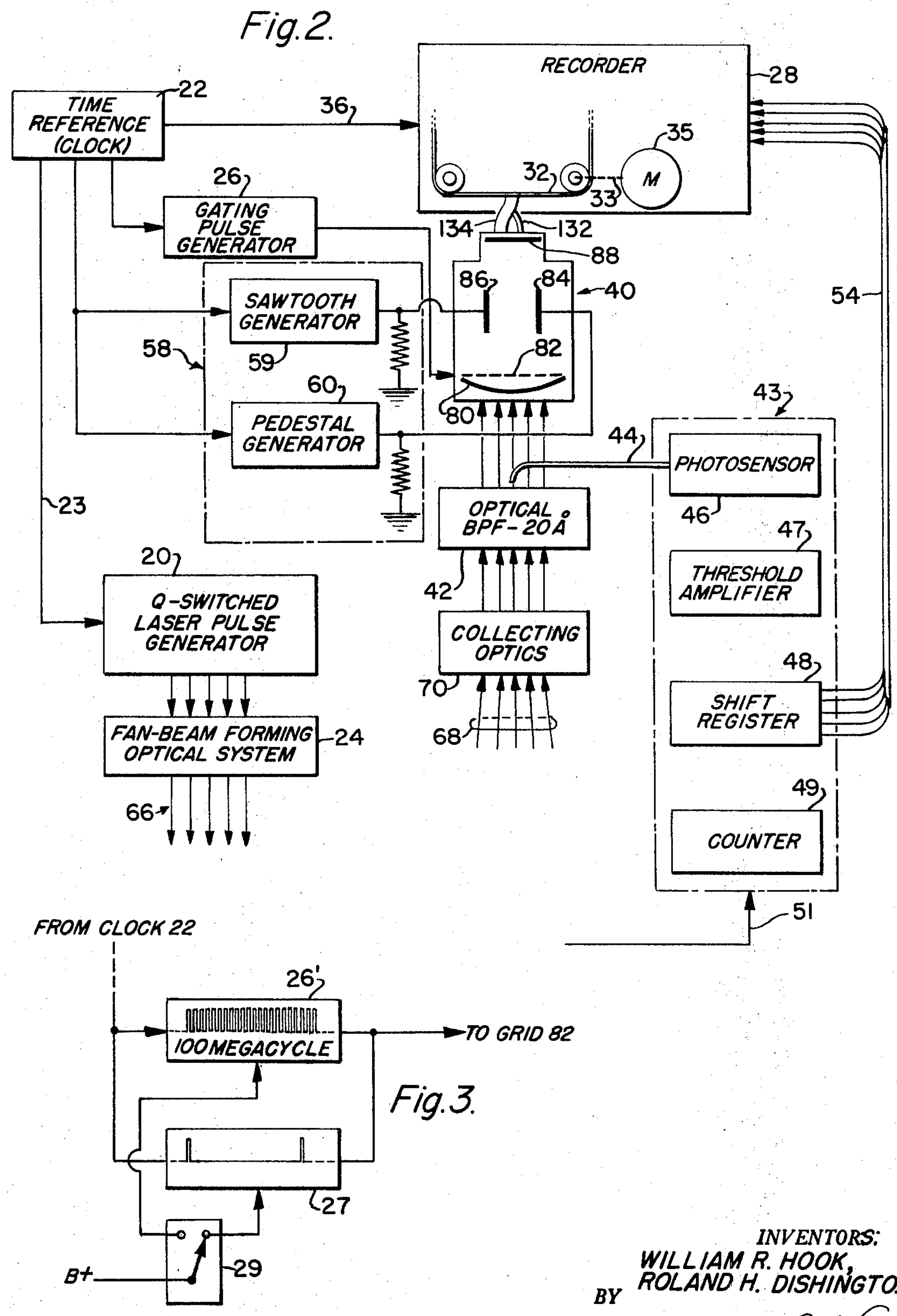
FIG. 2 is a block diagram representation of one system which may be used for applying a method in accordance with the invention.
FIG. 3 is a fragmentary circuit diagram illustrating an optional alternative arrangement of a portion of the system shown in FIG. 2.

Referring to FIG. 2, the apparatus carried by the vehicle 10 includes a "Q-switched" laser pulse generator 20 which is preferably adapted to generate a series of pulses of coherent light with each light pulse having a time duration of about 5 nanoseconds and an energy per pulse of the order of two or three millijoules. One laser pulse generator which is suitable for use in methods and systems in accordance with the invention is described, for example, in an article by McClung and Hellworth entitled, "Characteristics of Giant Optical Pulsations From Ruby," proceedings of the IEEE volume 51, Number 1, January 1963, page 46. Another laser apparatus suitable for use in accordance with the invention is described in copending application Ser. No. 370,864, of R. S. Witte and L. M. Frantz, filed May 28, 1964, now abandoned and assigned to the same assignee as that of the present invention.

In accordance with one illustrative embodiment of our invention there is associated with the pulse generator 20 a fan beam forming optical system 24 (FIG. 2) which is more particularly described hereinafter in connection with the description of FIGS. 10–13. For the moment, it is sufficient to observe that the optical system 24 receives the laser pulses emanating from the generator 20 and directs each pulse into a beam path 13 (FIG. 1) which is about 0.1 milliradian thick by 10 milliradians wide. The precise angular width and thickness of the beam propagated from the vehicle 10 is not critical; however, it should be understood that in this particular embodiment, it is desired to simultaneously illuminate all portions of an elongated strip 14 which extends substantially normal to the flight line 12 and which has a length to width ratio of the order of about 100. In the specific example wherein the fan beam is 0.1 x 10 milliradians and the vehicle 10 flies at an altitude of about 10,000 feet, each pulse illuminates a strip of terrain 100 feet long and 1 foot wide. Specifically, a first pulse illuminates the first strip 14, and the following time successive pulses respectively illuminate the successive strips 16, 17, 18, etc. Thus one laser output pulse is transmitted from the apparatus of FIG. 2 for each foot of ground along the flight path 12. In the specific system, vehicle 10 traverses the flight path at a ground speed of 500 feet per second and the generator 20 is synchronized with the actual ground speed to have a pulse repetition rate of 500 pulses per second, with each pulse having a time duration of 5 nanoseconds. The generator 20 is controlled by a time reference means or clock 22 which applies trigger pulses to the generator 20 by way of line 23. The clock 22, of course, is preferably synchronized with the actual ground speed of the vehicle 10. Alternatively, the laser pulse generator 20 may be "free-running" with the clock being "slaved" thereto.

In addition to the foregoing pulse transmission system, the apparatus illustrated in FIG. 2 includes an image receiving and processing system which comprises an image forming optical system or light collector 70, a narrow band optical filter 42, a gateable image translation means which preferably takes the form of an image converter tube 40, and an image recording mechanism or camera 28. The optical light collector 70 will be described in more detail hereinafter in connection with FIGS. 7 to 12. For the present, it is sufficient to note that the collector 70 views the strip 14 (FIG. 1), gathers a portion of the light emanating therefrom, and forms an optical image of the strip 14 substantially at the photocathode of image tube 40. Obviously, as the vehicle 10 moves along the flight path, collector 70 successively views the successive strips 16, 17, 18, etc.

The image converter tube 40 functions firstly as an ultra high speed lhutter or time domain image gating means. Additionally the image converter tube provides light amplification by longitudinal acceleration of the two dimensional electron images therein, and optionally includes a mechanism for occasional high speed transverse deflection of the electron images. Structurally, the image converter tube 40 comprises a cylindrical, evacuated envelope containing a photocathode 80 at one end, a fluorescent screen 88 at the other end, a control grid 82 adjacent the photocathode, and a pair of deflection plates 84, 86 spaced apart in the central region between the control grid 82 and the fluorescent screen 88. The image converter tube ordinarily contains additional electrodes such as focusing and accelerating electrodes and also requires a high voltage supply. These latter well known features and components are omitted for simplicity it being sufficient to note that the image converter tube 40 in this embodiment is a device manufactured by RCA and identifiable as their developmental type number C73435A or the equivalent. Such an image converter tube, suitable for use in the method and system of the present invention is described in more particular detail in copending application Ser. No. 283,423, filed May 27, 1963, now U.S. Pat. No. 3,292,031, which application is assigned to the same assignee as the present invention.

To provide periodic shuttering or gating of the two dimensional electron images formed at photocathode 80, a gating pulse generator 26, which may be a conventional 100 megacycle oscillator, is connected to apply its output to the control grid 82. The gating pulse generator 26 is synchronized and phase-locked with the transmitted laser pulses by application of an appropriate reference signal from clock 22 to the input terminals of generator 26.

Visible light patterns formed at the output screen of the image tube 40 are imaged, by a fibre optic element 132, on the surface of a film strip 32 carried within the camera 28. The elongated film strip 32 is preferably driven continuously by a motor 35 and a conventional mechanical coupling 33. In preferred embodiments the motor 35 and hence the film motion is synchronized with the ground speed of the vehicle 10. Additionally, the image receiving and processing system includes a range indicating and recording channel 43 for extracting a portion of each received light pulse and measuring the pulse return time. As shown in block diagram form in FIG. 2, the range channel 43 comprises a light pipe 44, photomultiplier tube or other photosensor 46, a threshold amplifier 47, a shift register 48 and a time counter 49. A pulse from the photosensor 46, indicative of the time of arrival of a particular light "echo," is applied through amplifier 47 to the shift register 48 to transfer the contents of counter 49 to the shift register 48. Thus during the interpulse period following each successive echo, range channel 43 provides, at the output of register 48, a digital indication of the range of the particular object from which the preceding light pulse was reflected. The digital range information from shift register 48 is applied over cable 54 to an appropriate arrangement within the camera 28 for recording the range information in digital form on a portion of the film strip 32. Since the range channel 43 preferably is substantially identical to digital range indicating systems which have been used heretofore in laser range finding systems, it will not be described in further detail. One such digital range indicating system is described, for example, in an article entitled, "Lasers for Ranging Applications," by E. Kornstein, RCA publication PE–176 (1963).

The operation of the system illustrated in FIG. 2 is substantially as follows:

Considering FIGS. 1, 2 and 4, let us momentarily assume that the clock 22 provides a trigger pulse at time $t_0$ and thereby triggers transmitter 20 to propagate a pulse toward the terrain strip 14. That output pulse is shaped by optical system 24 so that substantially all of the light energy is confined to and uniformly distributed across the terrain strip 14. Given a vehicle altitude of 10,000 feet, the pulse flight time (down and back) is approximately 20 microseconds. Thus, in order for the light which is reflected from a given terrain area to be detected and processed, the image receiving portion of the apparatus must be "open" or light responsive during a short time interval 20,000 nanoseconds subsequent to $t_0$. That "shutter open" time interval preferably has a duration of only 5 nanoseconds. The light energy reflected from the terrain strip 14 is collected by optical system 70 and directed therefrom through band pass filter 42 to form a real image at photocathode 80. Flter 42 operates to reject sunlight "noise" while admitting substantially only the reflected narrow-band radiation originating from the laser pulse transmitter 20. The space-domain images passed by filter 42 are received and detected by image tube 40 which is employed in a unique manner, as more particularly described hereinafter, to accomplish real time reduction of the terrain representative image information from a set of many absolute source indications directly to a contour map of the terrain. More specifically, gating pulses are applied to the control grid or gating grid 82 from the clock 22 by way of gating pulse generator 26 which provides a train of 5 nanosecond duration voltage pulses during the entire period between successive output light pulses from the laser pulse generator 20. As each 5 nanosecond pulse from the generator 26 is applied to the gating grid 82, the image tube 40 is turned on or rendered capable of transmitting an electron space image from the photoemissive cathode 80 toward the output phosphor 88. During the 5 nanosecond "off" periods between successive output pulses from generator 26, the gating grid is negatively biased so that any electrons emitted from cathode 80 fall back to the cathode and the partial space image which those rejected electrons would ordinarily form is effectively discarded.

In order to better understand the way in which the gating action generates contour lines, it is useful to consider the graphs shown in FIGS. 4 and 5. Curve 79 (FIG, 4) shows a time graph of the instantaneous transmissivity of the image tube, as governed by the gating generator 26. Curve 81 is a time graph of a typical return pulse 81 which has been reflected from a particular point on the ground within the illuminated strip 14 and which has been imaged onto a particular point on the image tube photoemissive cathode 80. The leading edge of this pulse has returned at a time designated $t_r$. For the particular pulse 81, about half the electrons which left the photocathode 80 due to the arrival of this pulse are rejected by the gating action of the gating grid 82, and about one half are passed. That is, curve 83 (FIG. 4) is a time graph of the partial image which is transmitted through converter tube 40, when the same is electrically gated by the waveform 79 and receives the light pulse 81 at photocathode 80. The electrons that pass are accelerated toward the fluorescent screen 88, and, being focused to a point, cause fluorescence at the particular spot on the output screen which corresponds to the aforementioned particular point on the ground. Now if pulse 81 had arrived at a time slightly later it would have been "passed" completely, which is to say that all the electrons leaving the cathode would have passed to the phosphor screen 88, thus causing the screen to fluoresce with twice the brightness as in the case of the pulse 81. Similarly, if the pulse had arrived slightly earlier it would have been completely rejected, and if it had arrived still earlier some electrons would have again been passed. Curve 85 in FIG. 5 is a graph showing the resultant output phosphor brightness as a function of time of return $t_r$. It can be seen that curve 85 is roughly triangular and repetitive at 10 nanoseconds intervals, which is to say that all returning light pulses which arrive at integral multiples of 10 nanoseconds cause the phosphor to be brightened by the same amount. Since 10 nanoseconds difference in time of flight is equivalent to very nearly 5 feet difference in absolute range, curve 85 also shows that individual points on the ground separated by 5 feet altitude intervals cause equal brightening of the screen 88. In the discussion that follows it shall be considered that a signal return has been "passed" if it has a range such that the phosphor is brighter than ½ maximum, and it shall further be considered that a particular echo has been "rejected" if it has a range such that the phosphor is less than ½ the maximum brightness. Thus for simplicity of explanation the idealized phosphor brightness curve 87 will be used; however, the reader should remember that what is actually meant by "pass" or "reject" is whether a return is above or below the ½ maximum amplitude point. If more than 50% of the energy of an "echo" from a given terrain increment has a return time such that it is translated through the image tube, the echo is said to be "passed." If less than 50% it is considered "rejected."

Now, consider the over-all operation of the image tube as a strip of ground is illuminated. Suppose, for example, that the highest point or points in the strip are at 200 feet elevation. As the first reflected light "echoes" arrive back at the image tube 40, all the time successive elemental echoes are converted to electron images, but only those which arrive within the alternate 5 nanosecond return times indicated by curve 87 are translated through the image tube 40. Accordingly, at the output phosphor 88, a visible light pattern is created having high brightness at areas corresponding to all incremental areas within the terrain strip 14 which have altitudes of 200±1.25 feet.

Ten nanoseconds later there is superimposed on that first pattern another image corresponding to all increments of the terrain element 14 having altitudes of 195±1.25 feet. Still later, there is superimposed a third partial-image corresponding to all terrain elements having elevations of 190±1.25 feet. Thus a pattern is built up on the output phosphor 88 which is a true representation of the 5 foot contour-line intervals of the terrain strip 14. The resultant fluorescent pattern may be continuously photographed by camera 28, to generate a photographic representation of the particular contour line intervals of the terrain strip 14.

In the foregoing paragraphs, for clarity, it was assumed that a single laser pulse was transmitted. As stated heretofore, the laser pulse transmitter 20 actually sends a train of 5 nanosecond duration pulses at a repetition rate of 500 pulses per second. Thus the interpulse period is two milliseconds. Conveniently, the camera 28 may be synchronized to photograph the image tube output phospor once every two milliseconds or synchronously with the transmitter. That operation is readily accomplished by applying timing pulses from the clock 22 to camera 28 by way of line 36. It must be observed that the gating pulse generator 26 preferably applies a 100 megacycle square wave to the gating grid 82 so that the image tube 40 is gated "on" for a time of 5 nanoseconds and then "off" for 5 nanoseconds and "on" again for 5 nanoseconds, etc. Since the gating pulse generator is phase synchronized with the laser pulse transmitter 20, all those reflected light "echoes" which have down-and-back travel times which are integral multiples of 10 nanoseconds will be "passed" or preserved by the image tube 40 and will contribute to the contour line image recorded on film strip 32. Thus as the aircraft flies along the flight path 12, and subsequent terrain strips 16, 17, 18, etc. are illuminated by successive laser transmitter pulses, the image tube 40 produces successive representations of the contour lines of successive terrain strips. The fluorescent decay time of the image tube phosphor is short with respect to the 2.5 milliseconds interpulse period, being about 30 microseconds for the specific tube used in the preferred system. Thus, the synchronized camera 28 photographs individual and non-overlapping terrain strip contour images. The effect then is to expose the film at all spaced points corresponding to incremental portions of the terrain strips whose elevations are within specified 2.5 foot elevation bands. Such markings constitute topographical contour lines on the film 32. Section *b* of the film strip 32, as shown in FIG. 14 is, when considered as a whole, an accurate contour map of the 100 foot wide flight path traversed by the vehicle 10.

It is convenient, though not necessary in all cases, to have "coarse" contour intervals, preferably every 25 feet, distinctly indicated on the photo map. Such contour lines are indicated by reference numerals 73 and 75 in FIG. 14. This effect may be achieved by applying an alternate type gating waveform to the image tube grid 82, this waveform being "on" for 5 nanoseconds and "off" for 50 nanoseconds. If this alternate waveform is used to process every other transmitted pulse, the resultant contour photo map will have intermediate 5 foot contour lines 72, 74, etc. which appear less intense than the 25 foot coarse lines 73, 75 since these intermediate contour lines are only printed on the film one-half as often as the "'coarse" contour lines 73, 75. An alternate gating generator circuit arrangement, for optional use in those systems where it is desired to provide "coarse" contour lines at 25 foot elevation intervals is shown in FIG. 3. Here, a time reference from clock 22 (FIG. 2) is applied to a 100 megacycle oscillator 26′ and also to a flip-flop oscillator 27 which provides 5 nanosecond duration pulses at 50 nanosecond intervals. The oscillators 26′ and 27 are coupled commonly to the grid 82 but are alternately energized. That is, energizing potential B+ is supplied through an electronic switch means 29 so that oscillator 26′ is de-energized when oscillator 29 is energized and vice-versa. Switch 29 may be synchronized b ypulse transmitter 20 to put the 20 megacycle oscillator 27 in the circuit during the echo return time following every other transmitter pulse.

The contour map itself, as shown in Section *b* of FIG. 14, has no elevation identification marks but merely indicates that the region 72, for example, is either 5 feet higher or lower than the region 74. Actual altitudes of the various contour lines 72, 74, etc. are supplied by range computing channel 43 comprising the components 46–49 as shown in FIG. 2. As stated heretofore, range channel 43 uses light pipe 44 to extract an incremental portion from the center of the light image transmitted by optical filter 42. That incremental image portion, impinging on phototube 46, produces an electrical signal output pulse having a time of occurrence representative of the range to the center point of terrain strip 14. That range indicative signal is used via threshold amplifier 47 to transfer the contents of counter 49 to the shift register 48. The counter 49 is provided with an input at line 51 from the clock 22 to reset the counter at the time each successive laser pulse is transmitted. Thus when the contents of the counter 49 are transferred to the shift register 48 a range reading is provided at the output of the shift register and is transmitted over line 54 and recorded in digital form on Section *c* of the film strip 32 (FIG. 14). Such recording of the digital output from register 48 is accomplished, for example, by a row of neon lamps (not shown) arranged to "write" a single binary number on the film strip during the interpulse period following each successive transmitter output pulse. Thus the altitude along the centerline 12 of the flight path is recorded in the form of successive binary numbers which respectively represent the altitudes at the centers of the successive transverse strips 14, 16, 17, 18, etc. Since those strips are each one foot thick, it is apparent that the range measuring channel 43 provides digitally coded altitude measurements at one foot intervals along the flight path. Since each successive transmitter pulse has a duration of 5 nanoseconds, each altitude measurement has an accuracy of ±1.25 feet. Of course, it is not at all essential to the invention that digital techniques be used for range recording. Alternatively, the range computing channel 43 (FIG. 2) may comprise a conventional analogg circuit for measuring the return time of the successive pulse images. Such analog information is, in that case, directly recorded as a flight path profile as indicated by curve 116 in FIG. 15. FIG. 15 is representative of this alternative form of Sectons *c* and *d* of the film strip 32.

Figure 6:
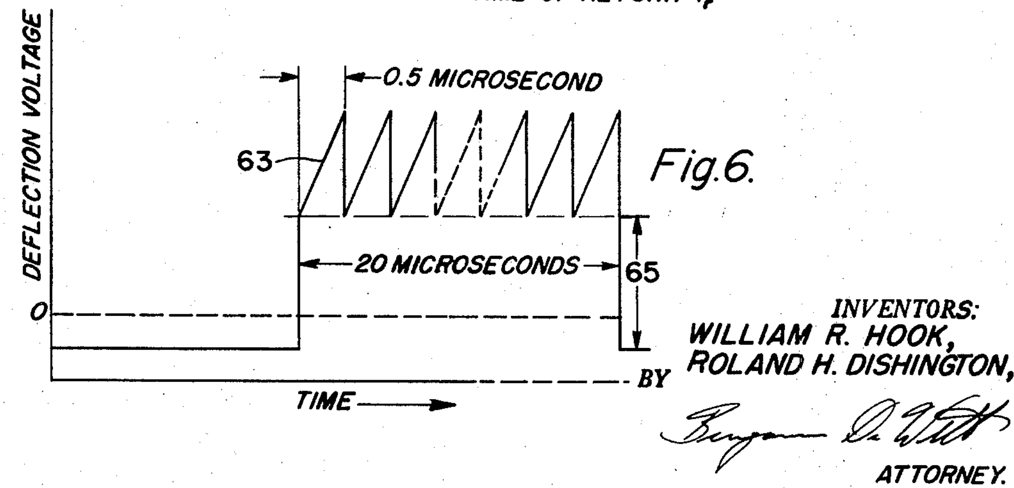

Further, it should be noted that the contour map (FIG. 14, Section *b*), by itself, does not provide direction-of-slope information. That is, the adjacent contour lines 72 and 74 simply specify that the elemental terrain areas thereunder are separated 5 feet in elevation. Which of a pair of contour lines is the highest cannot be directly determined from the contour map alone. This information can be determined for all contour lines which cross the centerline by referring to the absolute range data described in the previous paragraph, but cannot be determined for contour lines which do not cross the center line. To allow the determination of the slope from the center line to the edge of the contour map, and to further provide direct and visual slope information in a convenient form, the apparatus of the present invention is arranged to periodically generate a profile of the terrain in a direction normal to the flight path (i.e., in the direction of the transverse strip 14). Such transverse contours or slope indicative records, as shown in Section *a* of FIG. 14, are generated by periodically operating the image converter tube 40 in its so-called "streak" mode. To that end, the image receiving apparatus (FIG. 2) further includes a deflection generator 58, synchronized by signals from clock 22 and operative to apply two different deflection waveforms to deflection plates 84 and 86, respectively, of the image converter tube. While it is not essential that the transverse profiles be generated at regular periodic intervals, it has been found convenient to perform this function once every 100 transmitter pulses (i.e., at five times per second). To that end time-reference signals indicative of every 100th laser output pulse are applied over line 56 to deflection system 58 comprising sawtooth generator 59, and pedestal generator 60. The output signals from generators 59 and 60 are applied respectively to deflection plates 86 and 84, so that an electron partial image passing between the plates is subjected to an effective deflection voltage equal to the sum of the pedestal and the sawtooth. This composite deflection waveform 63 is shown in FIG. 6. It is to be observed from FIG. 6 that the pedestal output 65 of generator 60 is large compared to the peak-to-peak value of the sawtooth wave. The pedestal portion serves to transfer the arriving electron images from the right hand half of the phosphor 88 to the left hand half. Accordingly, during the first 99 of every 100 transmitter periods the image is registered with fibre optic element 132 which conducts the image to Section *b* of the film strip (FIG. 14). During the return period following each 100th transmitter pulse the output image is registered with fibre optic element 134.

Figure 7:
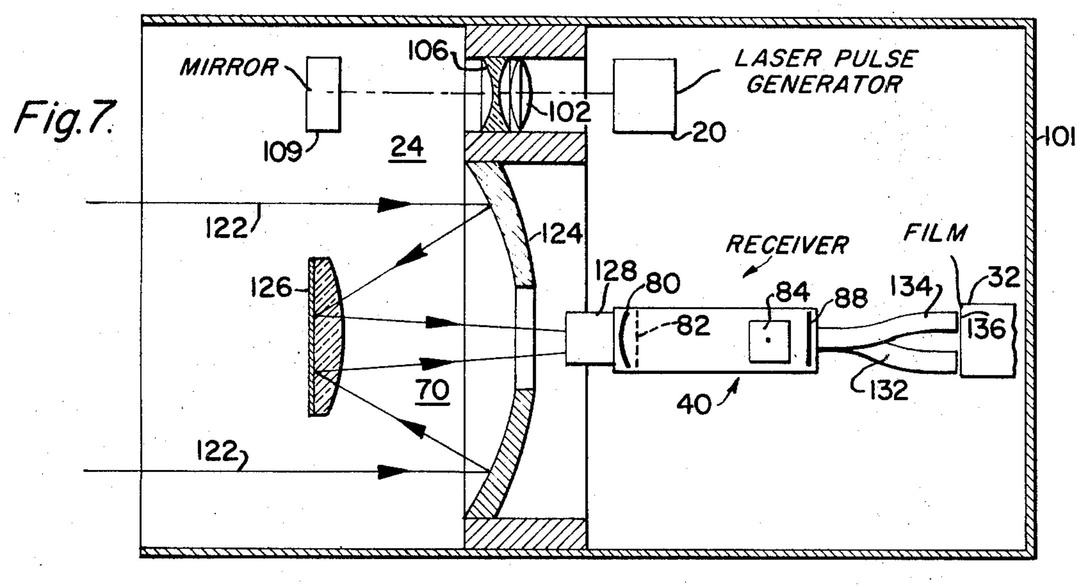
FIGS. 7 and 8 are, respectively, a plan view and a side view of apparatus in accordance with one aspect of the invention.
Figure 8:
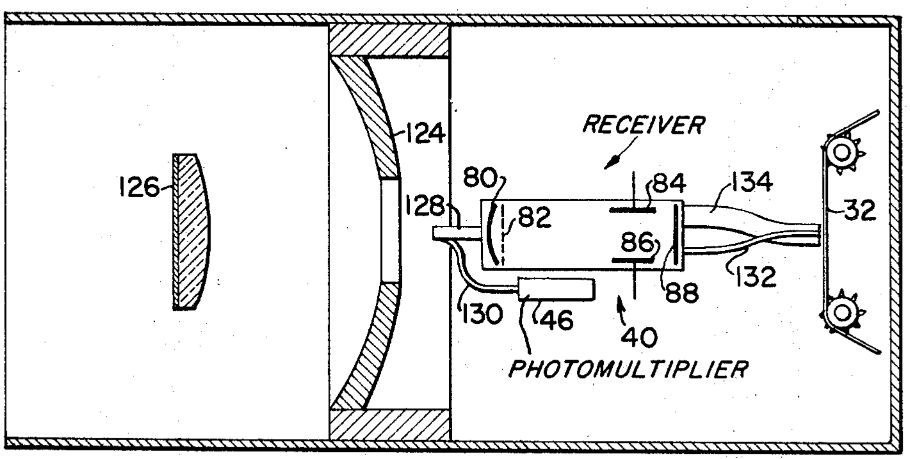
Figure 16:
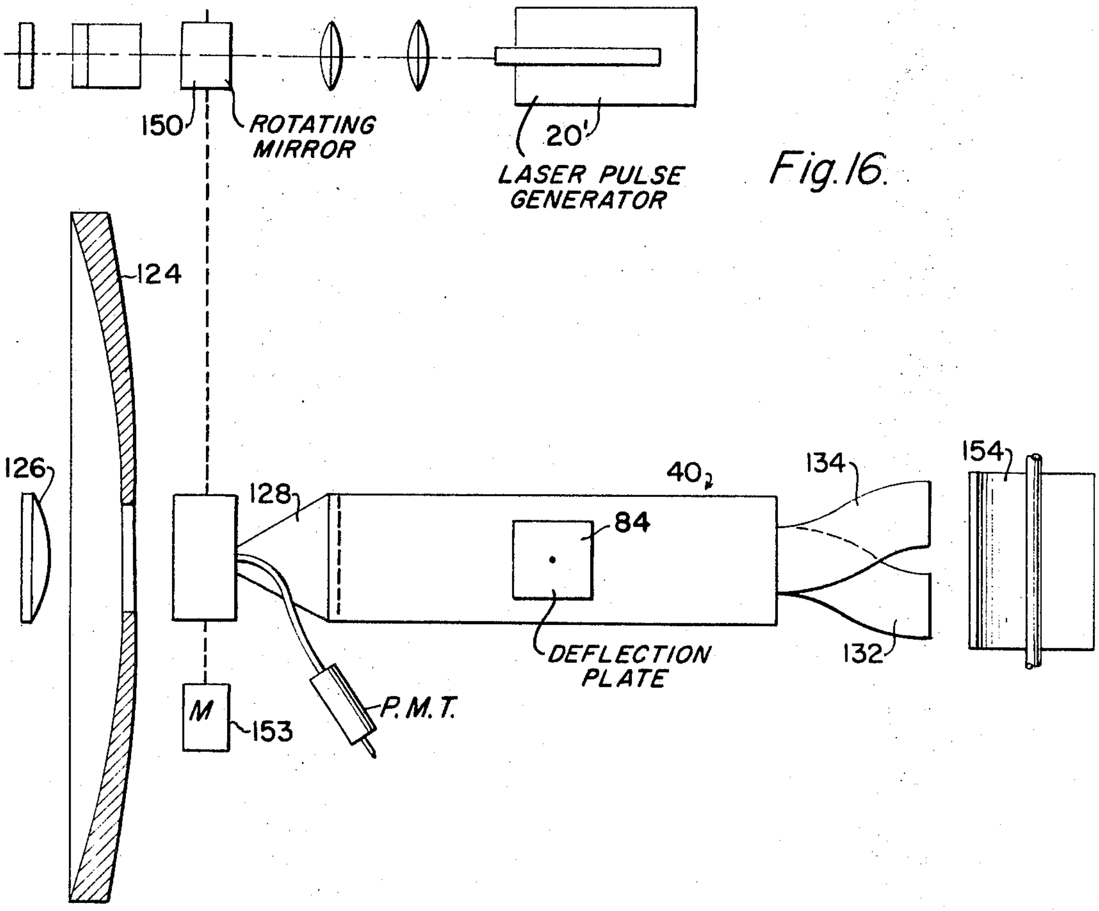
FIGS. 16 and 17 are, respectively, a plan view and a side view in diagrammatic form of a further embodiment of apparatus in accordance with the invention.

As best shown in FIGS. 7, 8 and 16, the fibre optic elements 132 and 134 do not extend along straight parallel lines from the image output screen 88 to the film 32. Rather, element 132 is bent upwardly and to the left so that its output end registers with Section *b* of the film (FIG. 14). Conversely optic element 134 extends downwardly and to the right in a manner to apply the transverse profile images to Section *a* of the film. Accordingly, during the return time following each 100th transmitter pulse the "profiling" mechanism just described operates to record a true profile of the terrain taken in a plane normal to flight line 12. As shown in FIG. 14, curve 67 is a correct representation of the slope variations across the contour lines 72 and 74 at the position indicated by dotted line 83. Curve 69 is a transverse profile across a point 100 feet further along the flight path (i.e., at the position of dotted line 85). The image converter tube which we have used has a lateral deflection dynamic range of about 100 to one. Using a sawtooth duration of 0.5 microsecond as indicated in FIG. 2*c*, a 250 foot range of altitudes may be covered with each successive sawtooth of the curve 63. Thus, where the actual altitude of the terrain which is being transversed is not known it is necessary to provide a series of 40 successive sawtooth cycles on the pedestal 65. That is, a series of 40 scans encompasses an altitude range of 10,000 feet. Accordingly the deflection system 58 is arranged to provide a deflection pedestal 65 having a duration of 20 microseconds with 40 successive sawtooth cycles superimposed on the pedestal. With this arrangement the first sawtooth of curve 63 causes the image converter tube to scan the first 250 feet altitude increment below the vehicle 10. Each successive 0.5 microsecond sawtooth scans the next successive 250 feet altitude range. Thus as the sawtooth waveform repeats all altitudes from zero to 10,000 feet are covered or monitored but with a 250 foot ambiguity. This simply means that if all portions of the terrain across the 100 foot wide strip are within 250 feet of each other the curve 67 (FIG. 14) will be a correct representation of the slope variations across the width of the contour map (Section *b*). The curve 67 is ambiguous in the sense that it does not directly indicate whether the terrain has an elevation between zero and 250 feet, or between 250 feet and 500 feet, etc. This ambiguity is readily resolved by reference to Section *c* of the film strip for information concerning the actual altitude of the center point where dotted line 83 intercepts the center line 12 of the flight path.

As illustrated in FIG. 14, the curves 67, 69, etc. represent transverse profiles taken during the period of every 100th transmitter pulse. During such 100th periods of the system, the gating pulse generator 26 is preferably de-energized so that the image tube is not gated during the period when the transverse profile 67, for example, is being generated.

In the specific example which has been illustrated in FIGS. 1 and 2 a pulse is transmitted every 2.5 milliseconds and scanning along the flight path 12 is accomplished by the motion of the vehicle 10. The film 32 runs continuously at about 2 centimeters per second and preferably is synchronized with the vehicle ground speed.

Figure 9:
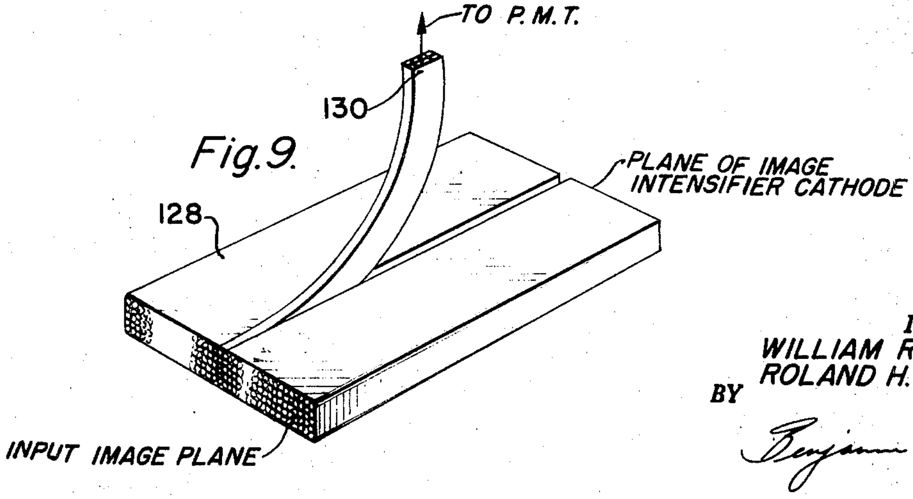
FIG. 9 is an enlarged perspective view of one component of the apparatus shown in FIGS. 7 and 8.
Figure 10:
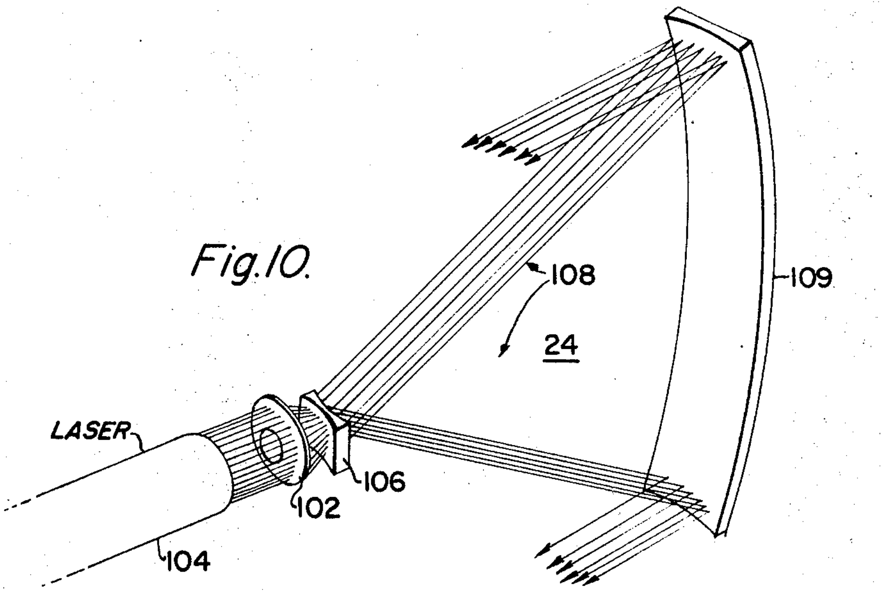
FIG. 10 is a diagrammatic perspective view of the radiation pulse propagating portion of the system illustrated in FIGS. 2, 7 and 8.
Figures 11, 12:
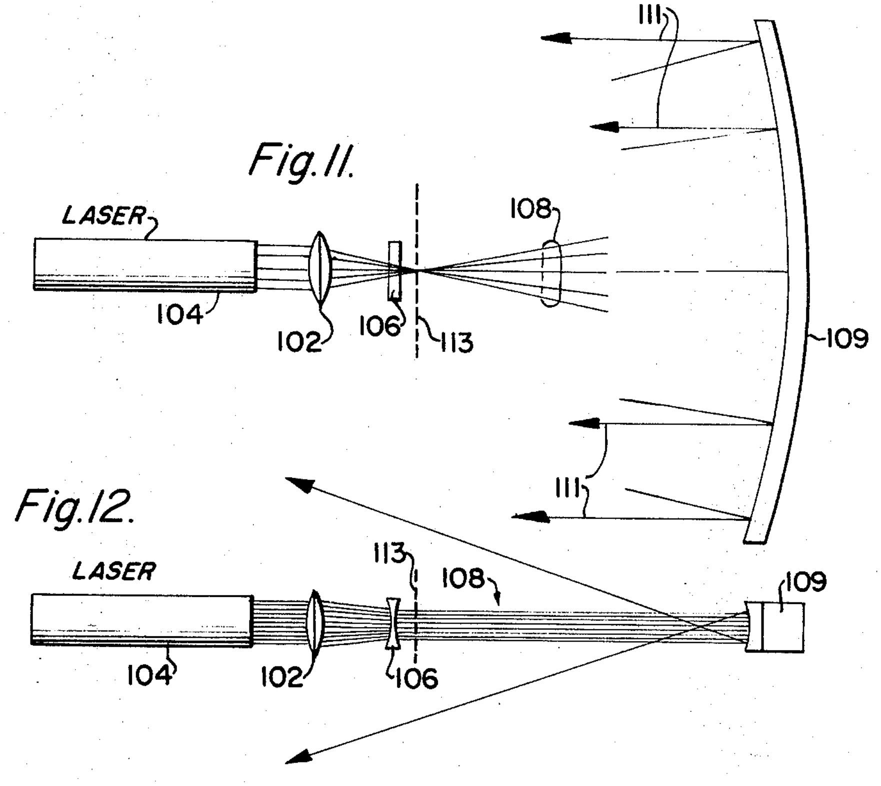
FIGS. 11 and 12 are, respectively, a side view and a plan view of the assembly illustrated in FIG. 10.

FIGS. 7 to 12 illustrate the actual structural arrangements used for one implementation of the system as described heretofore. Specifically, as shown in FIGS. 7 and 8, the system of FIG. 2 is built into a substantially rectangular housing 101 with the laser pulse generator 20 being mounted near one side wall in alignment with the optical components 102, 106 and 109 which comprise the fan beam forming optical system 24. As best shown in FIGS. 10–12 inclusive, the fan beam forming optical system comprises a spherical surface converging lens 102 which focuses the output beam from laser rod 104 toward a point focus. The converging beam is intercepted by a cylindrical surface diverging lens 106 which recollimates the beam in one dimension only. Thus, at the output of cylindrical lens 106, the beam 108 is divergent when viewed from the side (FIG. 11) and is closely collimated when viewed from the top (FIG. 12). The main mirror 109 recollimates the beam in the orthogonal plane and projects the output beam toward the ground along the fan-shaped beam path 13 as shown in FIG. 1. That is since the divergent rays 108 (FIG. 11) fall upon the spherical surface of mirror 109 they are returned to parallelism in the plane of FIG. 11, as indicated by lines 111, and are caused to diverge in the orthogonal plane (FIG. 12). Thus, the line-shaped bundle of rays which is present at the transmitter image plane 113 is imaged at the ground in a manner to uniformly illuminate the entire strip 14.

As shown in FIG. 13, the fan beam forming optical system 24 comprises the same elements as noted above but additionally includes a spherical surface folding mirror 121 which receives the beam 108 from cylindrical lens 106 and reflects it back to the spherical surface of the main mirror 109. It will be recognized that this particular arrangement is not essential to the concepts of the invention but is advantageous in that it reduces the over-all dimensions of the optical system.

The primary purposes of the optical system 70 of the echo receiver are to collect enough light to enable detection of the returning pulses from altitudes of the order of 10,000 feet, to reject reflected sunlight and to form an image of the currently viewed terrain area at the photocathode 80 of the image converter tube. As shown in FIGS. 7, 8 and 13, the light collecting optical system 70 comprises a Schmidt type arrangement including a spherical surface main mirror 124 which collects light impinging thereon from the echo return path 122. Rays impinging on the front surface of main mirror 124 are reflected back to a convex spherical surface folding mirror 126 which forms an image of the terrain strip 14 on one end of a fibre optic handle 128. The fibre optic bundle 128 is generally rectangular in cross section, as best shown in FIG. 9, and has its output end positioned closely adjacent the photocathode end of the image converter tube 40. Additionally, the fibre optic bundle 128 has a narrow central segment 130 bent out from the main bundle and directed to photomultiplier tube 46. The central segment 130 of the fibre optic bundle operates to extract a central increment from the image of terrain strip 14 with the extracted increment representing a central one foot square element of the illuminated terrain. That incremental portion of the image is routed to the photomultiplier 46. The remainder of the image is passed directly from the output end of the fibre optic bundle 128 to the photocathode of the image converter tube. It will be understood that central segment 130 of the fibre optic element, as shown in FIGS. 8, 9 and 13, is one exemplar implementation of the function represented by light pipe 44 in FIG. 2.

The optical band pass filter 42 (FIG. 2) has, for clarity been omitted from the system depicted in FIGS. 7, 8 and 13. It must be understood, however, that a narrow band pass filter for rejecting sunlight noise is a highly desirable part of the system. The optical band pass filter 42 (FIG. 2) may comprise any one of a variety of well known Fabry-Perot multilayer interference filters and, for example, may be positioned in the system of FIG. 13 between the main mirror 124 and the input end of the fibre optic element 128.

As described heretofore in connection with FIG. 2, the output pattern formed by electron impingement on the output screen 88 of the image converter tube is normally focused on the lower part of the screen 88. Since that output image is a narrow elongated image corresponding to the strip 14 (FIG. 1), it occupies a relatively small area near the bottom of the screen 88 as the same shown in FIG. 8. That image is transferred from screen 88 through a first output fibre optic member 12 and is focused on Section *b* of the film strip 32 (FIG. 14). To provide for the "streak" mode generation of the transverse profiles as described heretofore, a second output fibre optic member 134 extends from the upper portion of screen 88 to laterally displaced portion 136 of the film strip 32. This laterally displaced portion of the film strip corresponds to Section *a* of the film strip as shown in FIG. 14. It should be understood that the fibre optic elements 132 and 134 as shown in FIGS. 3, 4 and 8 are merely illustrative of one arrangement for transferring images from the upper and lower portions (FIG. 8) of the output screen 88 to corresponding laterally displaced portions of the film strip. Persons skilled in the art will appreciate that various mirror and lens arrangements can be used to accomplish the same image transfer function.

Figure 17:
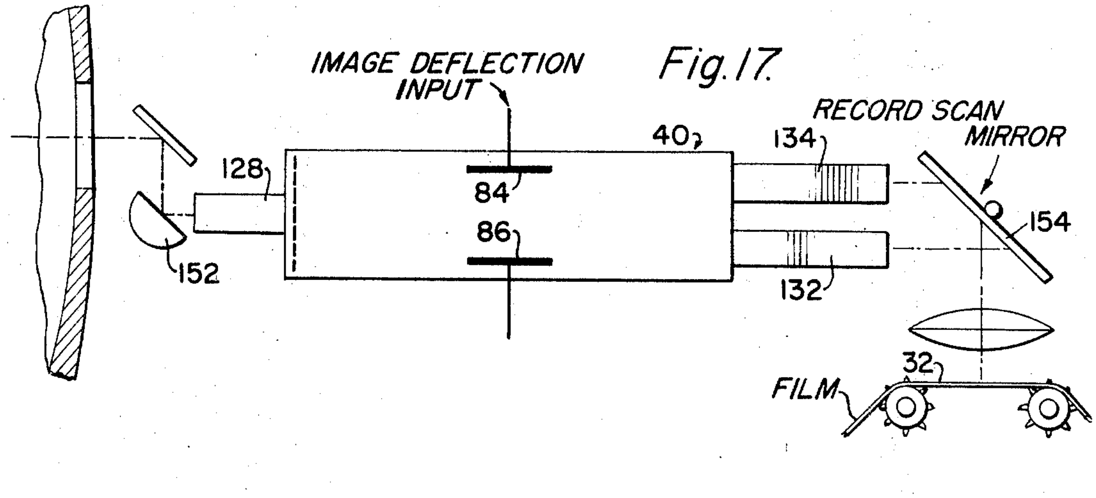

In the system described heretofore, it has been assumed, for convenience and clarity, that the laser pulse generator 20 transmits an output light pulse every two milliseconds and that scanning along the flight path is accomplished by motion of the vehicle 10. It may be desirable in some instances to photograph perhaps one hundred successive strips 14, 16, 17, 18, etc. in a period of the order of one millisecond. This "burst mode" alternative technique has the advantage, in some applications, of obviating the use of a platform or vehicle having long term stability. An apparatus which implements this alternative technique preferably employs a "Q-spoiled" laser pulse generator which is controlled by a Q-switching means to transmit within a few milliseconds a closely time-spaced group of several hundred output pulses. This mode of operation may be conveniently referred to as "burst mode" transmission in that during each cycle of operation, the laser pulse generator radiates a burst of about 100 pulses during a pump period of the order of one millisecond. When a three level laser, such as that described in the aforementioned McClung and Hellworth article, is operated in the "burst mode" improved efficiencies may be obtained in comparison with techniques which generate the same number of output pulses in a time long with respect to the normal fluorescent lifetime. To accommodate burst mode operation of the laser pulse generator 20, the contour mapping method and system of the present invention requires slight modification of the optical arrangements. This further embodiment in accordance with the invention is diagrammatically illustrated in FIGS. 16 and 17 wherein those components which are identical to the components of the previously described system are indicated by the same reference numerals. The system illustrated in FIGS. 16 and 17 is substantially the same as that shown in FIGS. 7–13 except for the addition of rotatable scanning mirrors 150, 152 and 154 which enable distribution of a burst of 100 pulses over a distance of 100 feet along the flight path. In this embodiment, the laser pulse generator 20' radiates a burst of 100 pulses with a burst repetition rate of 5 per second. That is, the laser emits 5 bursts per second and each burst includes 100 pulses. Each pulse has a duration of 5 nanoseconds. Each burst lasts for about one millisecond. The rotating mirror 150 rotates through a sufficient angle during each burst duration to spread the 100 output pulses across a 100 foot long portion of the flight path. Thus the first pulse of a given burst illuminates the transverse strip 14 as shown in FIG. 1 and the successive pulses within that same burst illuminate the successive transverse strips 16, 17, 18, etc. If the vehicle 10 flies at an altitude of 10,000 feet, the transmitter beam scanning mirror 150 should rotate through 10 milliradians during the one millisecond burst time. The rotatable scanning mirror 152 of the receiving system is mechanically coupled with the transmitter mirror 150 and therefore rotates at the same rate, both being driven, for example, by a synchronous motor 153. Mirror 152 causes the receiving system to scan its field of view across a 100 foot section of the flight path during one millisecond. Additionally, a rotating mirror 154 having the same angular rate is provided between the fibre optic image transfer elements 132 and 134 and the film strip 32. This enables the film strip 32 to be driven at a constant speed even though the terrain is optically scanned in 100 foot frames during successive one millisecond frame periods. During the one millisecond frame period, the rotatable mirror 154 is rotated at a rate sufficient to scan the image which it reflects over a 0.1 centimeter length of the film strip. In all other respects, the system illustrated in FIGS. 16 and 17 may be identical to that described heretofore in connection with FIGS. 2 and 7–13.

Figure 18:
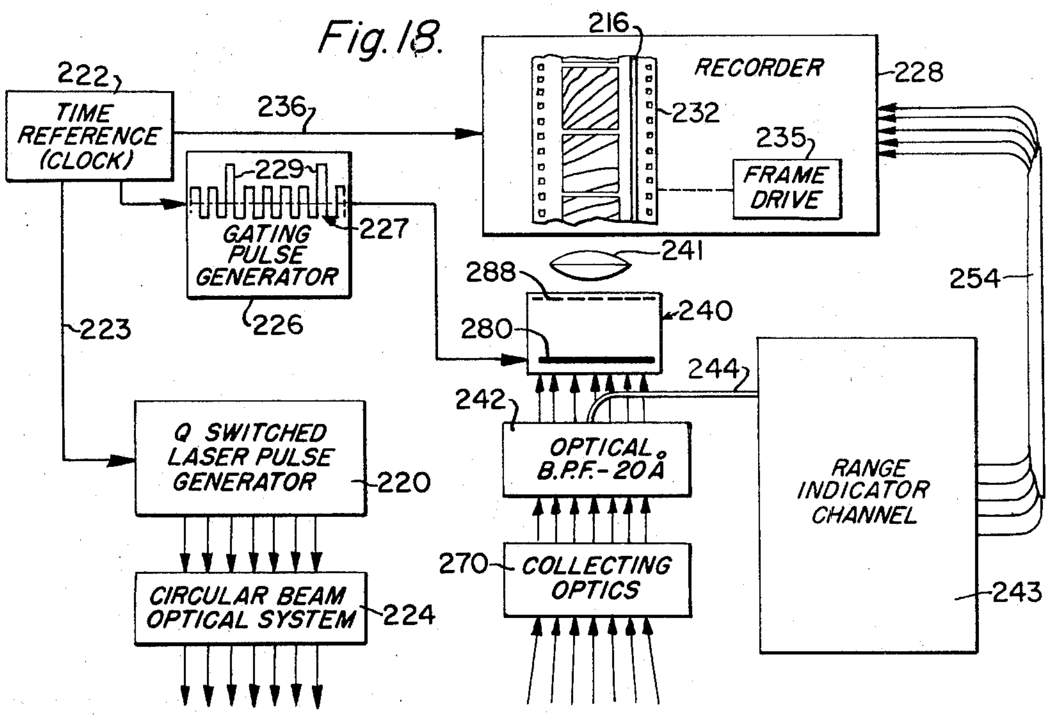
FIG. 18 is a block diagram generally similar to FIG. 2, but illustrating a still different implementation of the invention.
Figure 19:
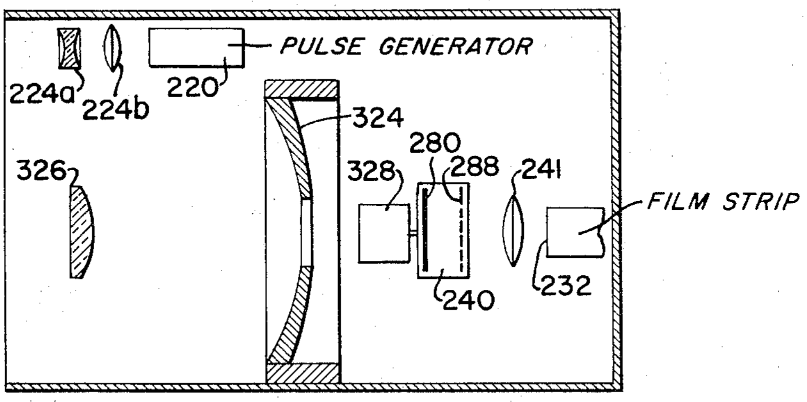
FIGS. 19 and 20 are, respectively, a side view and a plan view of apparatus embodying the system of FIG. 18.
Figure 20:
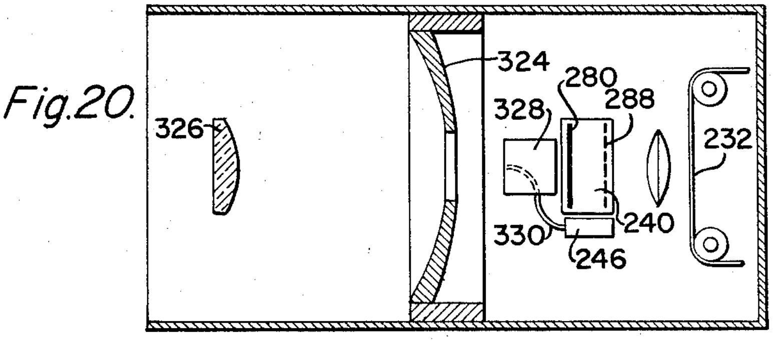

In FIGS. 18 through 20 there is illustrated a further embodiment in accordance with the present invention. In the specific embodiments which have been described heretofore, the method and apparatus of our invention has been described as employing a pulse transmission system arranged to provide a fan beam, that is, a beam having angular dimensions such that it is adapted to illuminate a transverse strip about one foot wide and 100 feet long. It is not at all essential that the apparatus be ar-arranged to successively illuminate elongated strips extending transversely of the flight path. Rather, the terrain area which is illuminated by a single pulse may have substantially any shape. FIGS. 18–20 illustrate a system which is presently thought to be a preferred form of the present invention and which is arranged to illuminate a different circular terrain area with each successive transmitter pulse. To emphasize that the apparatus of FIG. 18 is similar in many respects to that illustrated in FIG. 2, various elements in FIG. 16 have been designated by 200-series reference numerals corresponding to the reference numerals used in connection with FIG. 2. That is, for example, the time reference clock 222 in FIG. 16 may be substantially identical to clock 22 of FIG. 2, and gating pulse generator 226 corresponds to the similar but not identical generator 26 of FIG. 2. The system illustrated in FIG. 18 comprises a Q-switched laser pulse generator 220 arranged to generate successive optical output pulses which are formed into a cylindrical or conical beam by a circular-beam optical system 224. As shown in FIG. 19, the optical system 224 preferably comprises a spherical surface converging lens **224*a* and a spherical surface diverging lens 224*b* arranged in that order along the output beam path. Thus the optical system provides a diffraction limited cylindrical light beam having a main energy lobe which will illuminate about a 100 foot diameter with each transmitter pulse, assuming that the vehicle flies at an altitude about 10,000 feet above the terrain. One advantage of the system illustrated in FIGS. 18 to 20 is that the transmitter optical system is greatly simplified and may use conventional small diameter lenses rather than the large area mirrors of FIG. 13. Another advantage is that since each transmitter pulse covers 100 feet in distance along the flight path the pulse repetition rate of generator 220 can be much lower (i.e., 5 pulses per second) with each pulse having a correspondingly greater power. As stated heretofore, arrangements in which the laser 220** "dumps" all its energy in a single pulse or within a time which is short relative to the fluorescent lifetime of the material are frequently advantageous in that such arrangements provide a substantial improvement in the over-all efficiency of the laser.

The system of FIG. 18 further comprises light collecting optical system 270 and band pass filter 242 which components may be identical to the corresponding components of the apparatus shown in FIGS. 2 and 13. The light collected by optical system 270 is imaged through filter 242 on the photosensitive cathode 280 of an image translating device or image tube 240. While the embodiment illustrated in FIG. 18 can if desired use a focusing type image tube such as that described in the other embodiments, it should be understood that the invention is not limited to any particular type of image translating device but only requires a means for gating the received image at a rate of the order of 100 megacycles. To emphasize that substantially any gateable image translating device may be used the image tube 240 (FIG. 18) is illustrated as being an electronic imaging diode. One such imaging diode usable in the system of FIG. 18 is commercially available from Abtronics, Inc. as their model or type number LC–12. This type of imaging tube is rugged and otherwise advantageous in certain applications in that it does not have focusing electrodes, does not require focusing potentials and is not subject to defocusing as a result of variations in the anode-to-cathode potential. Moreover, since the image tube 240 is an electronic diode it has a current versus voltage characteristic similar to that of an ordinary vacuum tube diode, and hence may be gated by simply switching the anode potential on and off. As shown in FIG. 18 anode-to-cathode potential is applied to image tube 240 from the gating pulse generator 226 which may, in the simplest form, be a 100 megacycle oscillator followed by a high voltage power output stage adequate to drive the image tube to maximum gain during the positive half cycles and to drive it to cutoff during the negative half cycles.

The image tube 240 when it is so gated operates to pass partial images during alternate 5 nanosecond periods. For example, during the positive half cycles of the gating wave 227, image tube 240 passes the partial electron images which are then being emitted from the cathode 280. During the negative half cycles of the gating wave, any partial images which are generated by electrons impinging on the cathode are rejected. The gated partial images which are passed through image tube 240 fall on the phosphor anode 288 and create a visible light contour line representation of the terrain area which was illuminated by the most recent transmitter pulse. That image is focused by lens 241 on the film 232 of camera 228 and hence a contour map of that particular terrain area is recorded. In the system of FIG. 18 the camera 228 is arranged to photograph the image tube output on a frame-at-a-time basis. That is, the film drive mechanism 235 preferably is a lost motion drive or Geneva gear mechanism as commonly used in the motion picture industry. The camera 228 is synchronized by signals applied over line 236 from clock 222 so that a given film frame remains stationary relative to the image tube during the entire return time following each successive transmission of a pulse from the pulse generator 220. In the system of FIG. 18, the digital range indicator 243 is identical to the corresponding assembly 43 of FIG. 2 and functions in the same manner and to the same ends. Specifically, an incremental portion of the area being mapped is monitored by the light pipe 244 so that echoes returning from the center of the area illuminated are fed to a photomultiplier tube which initiates a measurement of the range or elevation of that particular terrain increment. That range measurement is applied from indicator 243 over cable 254 and digitally recorded along range track 216 of the film strip 232. While it is completely practical to use a range measuring system as just described and simply measure the range at the center of each 100 foot area illuminated by a laser pulse, such measurement of range at only one point within the area may give rise to ambiguities under certain circumstances. For that reason it may be desirable and is contemplated within the scope of the present invention to use a multiplicity of range channels (such as the system 243) to determine and record the range at several different spots within the field of view. This would of course require an equal plurality of elements similar to the light pipe 244 for extracting light pulses from different points within the cross-sectional area of the return image. The multiple range indicative signals derived by the plurality of range indicating channels would be recorded on a corresponding plurality of range tracks on the film.

The receiving portion of the system illustrated in FIGS. 18 to 20 differs from that of the earlier embodiments in another particular. Specifically, since the image which is being received in this embodiment is not an elongated strip but is a circular image it is necessary that the fibre optic receiving element 328 be as large in each dimension as is the image. Thus as shown in FIGS. 19 and 20, the fibre optic element 328 preferably is a cylindrical bundle of fibre optic strands having a diameter corresponding to the optical image of the terrain which is focused thereat by the spherical surface mirror elements 324 and 326. The remainder of the system as shown in FIGS. 17 and 18 preferably is structurally similar to the embodiments described earlier.

As stated heretofore in connection with FIG. 2, it is desirable to provide, on a contour map, distinctive lines indicating the "coarse" contour intervals. That is, the 5 foot elevation intervals are normally illustrated by light lines and the 25 foot contour intervals are normally listed by "heavy" or darker lines. In the system of FIG. 18 that function is achieved by utilizing gating waveform 227 in which every fifth gating pulse has an extra high amplitude. That is, as illustrated adjacent to generator 226 in FIG. 18, the pulses 229 corresponding to the 25 foot contour intervals have voltage levels at least twice as high as the ordinary "on" gating pulses. The use of these extra high voltage gating pulses for every fifth gating pulse causes the image tube 40 to have an electronic gain which is 2 or 3 times higher than normal. That increased gain means that the contour line image formed at the output phosphor 288 has 25 foot interval contour lines which are substantially brighter than the normal contour lines. Accordingly, on the photographic contour map the 25 foot interval contour lines 73 and 75 (FIG. 12) are relatively very black as compared to the normal contour lines 72 and 74.

It will be understood that the above described feature of providing accentuated contour lines at the 25 foot intervals is an optional feature of the apparatus of FIG. 18. For some applications that optional feature may be neither necessary nor desirable. Where it is desired to provide the above described optional feature, the gating pulse generator 226 may consist of two separate oscillators connected in parallel to the image tube 240 with the first one of the two being a conventional 100 megacycle oscillator to provide the normal gating pulses, and with the second one of the two being a 20 megacycle repetition rate multivibrator which produces extra high amplitude output pulses having 0.5 nanosecond duration.

It should be understood that the use of a diode-type image converter tube 240 is not limited to the system illustrated in FIG. 18. Rather, within the contemplated scope of the present invention any one of the embodiments described heretobefore may utilize either the focusing type image converter 40 (FIG. 2) or the diode image converter 240.

While the present invention has been described with reference to particular examples of apparatus it is to be understood that neither the method nor the systems of our invention are limited to the apparatus which has been described. Specifically, our invention is not to be construed as restricted to the use of an electronic image tube as a means for high speed gating of the received light beam. Persons skilled in the art, after having the benefit of our present disclosure, will appreciate that various other high speed, high repetition rate photo shuttering techniques and devices may be employed as alternatives to the image tubes which we have shown and described. One such photo shuttering device, for example, is the apparatus presently marketed by Baird-Atomic, Inc., Cambridge, Mass., as their "Model JX–1 Electro-optic Light Modulator." Other similar "light valves" employing either Kerr cells or Pockel cells are now well known in the art and may be used in systems and methods pursuant to the concepts and spirit of our invention.

While the present invention has been described with reference to certain exemplary embodiments only, it will be obvious to those skilled in the art that the invention is not so limited but is susceptible of various changes and modifications without departing from the spirit and scope thereof.

The embodiments of the invention in which an exclusive property or privilege is claimed are defined as follows:

1. A method of conducting a topographical survey to compile information concerning the surface irregularities of a terrain comprising the steps of:

propelling a vehicle and photosensitive imaging apparatus carried thereby along a predetermined traverse direction at a relatively high elevation above said terrain;

time successively propagating a large plurality of laser light pulses toward said terrain in a manner to time successively illuminate a large plurality of geographically successive elongated strip portions of the surface of said terrain with each successive strip being illuminated by a different successive light pulse, and with each strip being elongated in a direction substantially normal to said traverse direction and having a length to width ratio of the order of 100;

optically collecting, during each interpulse time interval immediately following illumination of a given strip, a portion of the light which is reflected from a given strip;

continuously converting said reflected light, on an as received time sequential basis, into two dimensional space-distributed electron images of said given strip;

time gating said electron images at a gating frequency of the order of 100 megacycles per second, preserving a first group of partial images representative of terrain portions having elevations within a plurality of spaced elevation ranges, and discarding a second group of partial images representative of terrain portions having elevation values interstitially intermediate said spaced elevations ranges;

and continuously photographically recording said first group of partial images to generate a contour line representation of the topography of said terrain.

2. A method for determining the distances to a plurality of differently distanced portions of a remote body which portions have finite reflectivity to impinging optical frequency radiation, said method comprising the steps of:

time successively propagating a plurality of pulses of optical frequency radiation toward said body in a manner such that successive pulses respectively illuminate different ones of a plurality of geographically successive areal sections of said remote body;

collecting optical frequency radiation which is reflected from said body and directing such reflected radiation along a predetermined optical axis, upon an image converter device of the type having an output phosphor, forming a two dimensional radiation image at a predetermined plane;

converting said radiation image to a two-dimensional electronic space-image, gating said image converter device to translate therethrough substantially only such space images as result from radiation arriving thereat during selected gate intervals;

and during each interpulse time interval following propagation of a radiation pulse toward said body, repetitively gating said image converter device a plurality of times to thereby convey at least first, second and third electron partial-images through said device, with said partial-images corresponding respectively to a higher area, and intermediate height area, and a lower area within the most recently illuminated section of said body;

successively impinging said first, second and third electron partial images in super-imposed relation on the output phosphor of said image converter device to create a visible light contour line image of said section;

and repetitively photographing at successive time intervals containing said first, second and third partial-images said output phosphor to thereby generate a contour representation of the distance of said first, second and third partial-images from the surface of said remote body.

3. A method in accordance with claim 1 and further including the steps of:

during each interpulse time interval, extracting an incremental portion of the collected return light corresponding to an image of the incremental terrain area directly beneath the plumb line of the vehicle;

measuring the mean return time of said incremental light portion and producing an electrical signal indicative of the plumb line distance of said vehicle above said terrain; and periodically recording said distance indicative signal to provide, in conjunction with said contour-line representation, a line-of-flight profile representation of the surface of said terrain.

4. A method for determining the relative distances from a predetermined location to a plurality of differently distanced objects, said method comprising the steps of:

propagating at least one relatively short duration pulse of electromagnetic radiation toward said objects from said location along a beam path having angular dimensions substantially larger than the angular spacing between objects which are to be resolved;

collecting electromagnetic radiation which is reflected from said objects in a manner to form a two dimensional radiation image at a predetermined plane;

time gating said image in a manner to preserve a first plurality of partial images and discard a second plurality of partial images of the irradiated field, with said first plurality being time-spaced to correspond to a plurality of discrete preselected range intervals and with said second plurality being representative of range values interstitially intermediate said discrete preselected range intervals;

and applying said first plurality of partial images to a recording medium and integrating the preserved partial images to thereby form a two-dimensional visual display which includes position-indicative representations of those differently distanced objects which have range values falling within said discrete preselected range intervals and excludes all objects having other distances from said predetermined location.

5. A method for determining the relative distances from a predetermined location to a plurality of differently distanced objects, said method comprising the steps of:

propagating at least one relatively short duration pulse of electromagnetic radiation toward said objects from said location along a beam path having angular dimensions substantially larger than the angular spacing between objects which are to be resolved;

collecting electromagnetic radiation which is reflected from said objects;

time gating said reflected radiation in a manner to preserve a first plurality of partial images and discard a second plurality of partial images of the irradiated field, with said first plurality being time-spaced to correspond to a plurality of discrete preselected range intervals and with said second plurality being representative of range values interstitially intermediate said discrete preselected range intervals;

and time-integrating the preserved partial images to form a two-dimensional visual display which includes representations of at least a plurality of differently distanced objects having range values falling within said discrete preselected range intervals and excludes all objects having other distances from said predetermined location.

6. A method for determining the distances from a predetermined location to a plurality of differently distanced objects, said method comprising:

propagating a pulse of electromagnetic radiation toward said objects along a beam path substantially larger than the spacing between objects which are to be resolved;

collecting electromagnetic radiation which is reflected from said objects;

time gating said reflected radiation to preserve a first plurality of partial images and discard a second plurality of partial images, with said first plurality being time-spaced to correspond to a plurality of discrete preselected range intervals and with said second plurality being representative of range values interstitially intermediate said discrete preselected range intervals;

and time-integrating the preserved partial images to form a visual display which includes relative-position-indicative representations of substantially all objects located within said discrete preselected range intervals and excludes substantially all objects having range values between any adjacent two of said range intervals.

7. In a system for automatically plotting contour lines from a vehicle in flight over the terrain to be mapped and in which system short duration pulses of optical frequency radiation are propagated toward a surface to be mapped and in which the return time of reflected pulses is measured to determine the relative heights of different portions of said surface, the combination of:

a Q-switched laser pulse transmitter carried by said vehicle for generating a train of accurately time-spaced submicrosecond light pulses;

optical beam-shaping means for spreading each of said light pulses over a beam path having a cross-sectional length-to-width ratio of the order of about one hundred, and directing the so spread light pulses to an elongated strip of said terrain extending substantially normal to the line of flight of said vehicle; and a map forming light pulse receiving and processing apparatus carried by said vehicle; said receiving apparatus comprising:

an optical light collector for receiving light energy pulses reflected from said terrain and directing said energy pulses along a predetermined optical axis;

an electronic image intensifier tube including a photo-emissive cathode, a gating grid adjacent said cathode, and an electron responsive light-emitting anode, with said tube being positioned in alignment with at least a portion of said optical axis to receive at said cathode substantially all light energy gathered by said collector;

circuit means, including a gating pulse generator coupled to said gating grid, for rendering said image tube responsive to translate electron space image during predetermined time spaced gating intervals having durations of the order of a few nanoseconds;

said circuit means for producing a train of gating pulses during a predetermined time following each light pulse output from said transmitter, with each such train of gating pulses including at least first, second and third pulses having interpulse time spacings of the order of at least a few nanoseconds;

said gating pulses causing said image tube to pass first, second and third partial images during first, second and third gating intervals with said partial images corresponding respectively to a higher area, an intermediate area, and a lower area within the terrain strip illuminated by the preceding transmitter pulse;

and photographic recording means operatively connected to receive the output of said image intensifier tube including an elongated film strip for producing a record of the light images generated at said anode by the time successive eltctron space images translated through said tube during said gating intervals.

8. A system in accordance with claim 7 wherein said image intensifier tube additionally includes a pair of spaced apart deflection plates positioned substantially parallel to each other and to the direction of translation of the electron images which are translated through said tube, and wherein said receiving apparatus includes circuit means, for supplying a sawtooth waveform voltage to said deflection plates, for laterally displacing said electron images as a function of time, to thereby occasionally generate at said light emissive anode a graphical representation of the relative terrain altitudes along the terrain strip which was illuminated by said preceding transmitter pulse.

9. A system in accordance with claim 7 wherein said receiving apparatus further includes range measuring means connected to receive timing information from said transmitter for determining the return time, after each transmitter pulse, of the light corresponding to a predetermined elemental portion of the terrain strip illuminated by said transmitter pulse; and circuit means, responsively coupled to said range measuring means, for recording along one portion of said film strip a representation of a terrain profile taken along a line parallel to the line of flight of said vehicle.

10. A system in accordance with claim 9 in which said range measuring means comprises:

a counter circuit connected to be initiated by a transmitter-pulse-time indicative signal;

means for extracting a predetermined incremental portion of the terrain image which is focused on said image intensifier;

a shift register;

and photosensitive means optically connected to receive the output of said means for extracting a predetermined incremental portion of the terrain image for utilizing said incremental image portion to transfer the contents of said counter to said shift register to thereby provide at the output of said shift register, during the latter portion of each transmitter interpulse period, a digital indication of the elevation of a predetermined incremental portion of the particular terrain strip which was illuminated by the immediately preceding transmitter pulse.

11. In a topographic mapping system of the type in which short duration pulses of optical frequency radiation are propagated toward a surface to be mapped and in which the return time of reflected pulses is measured to determine the relative heights of different portions of said surface, the combination of:

means for generating a train of time-spaced submicrosecond duration pulses of optical frequency radiation;

optical means receptive of said radiation for directing each of said pulses along a substantially fan-shaped beam path in a manner to substantially simultaneously illuminate all of an elongated strip of said surface having a length-to-width ratio of the order of at least ten;

a space image translation device positioned to receive return pulses of radiation reflected from said surface and having components which provide for said image translation device to be electrically gated to respond substantially only to images which arrive thereat during selected time-spaced time intervals having durations of the order of several nanoseconds;

timing circuit means coupled to said image translation device for rendering the latter responsive substantially only during a plurality of successive time-spaced time intervals, with different ones of said plurality occurring at different times corresponding to the altitude relative to the system of different portions of said elongated strip, whereby during at least first, second and third gate intervals said image translation device passes first, second and third partial images of said strip corresponding respectively to first, second and third elevationally distinct areas of said strip; and means operatively connected to said space image translation device for recording said first, second and third partial images on one elemental area portion of an elongated recording medium to thereby provide a contour-line-type of topographical map of said elongated strip of said surface.

12. In a radiation responsive apparatus for real time recording of topographical information, in which apparatus a laser means is used to provide short duration pulses of substantially coherent optical frequency radiation, and in which optical means receptive of said pulses is used to direct the same along a fan-shaped beam path to substantially simultaneously illuminate all portions of an area having a length which exceeds its width by at least an order of magnitude:

an image intensification device;

circuit means coupled to said laser means and to said intensification device for rendering said intensification device photo responsive during a plurality of successive time-spaced time intervals having duration of the order of about 10 nanoseconds or less;

and photographic means connected to receive the output of said image intensification device, said photographic means including a photographic emulsion carrying member for producing a record indicative of the portions of an illuminated area for which the radiation reflection paths from said laser means to said area and thence to said intensification device have lengths corresponding to any one of the different predetermined time spacings between the generation of a radiation output pulse by said laser means and the successive time intervals during which said intensification device is rendered responsive.

13. In an apparatus for measuring the distances from a predetermined point to a plurality of differently distanced and angularly spaced objects, the combination of:

transmitter means for propagating at least one short duration pulse of electromagnetic radiation toward said objects from said point;

means responsive to electromagnetic radiation reflected from said objects, for forming at a predetermined reference plane a time successive plurality of two-dimensional radiation images representative respectively of objects located within a plurality of preselected range intervals;

time-gated image translation means receptive of the images formed at said reference plane for preserving and translating a first set of the images of said plurality and effectively discarding a second set of the images, with said first set consisting of alternate ones of said time successive plurality and with said second set consisting of the ones which occupy, in the time domain, the interstices between the images of said first set;

and means for integrating said first set of images to form a space-domain display which includes representations of substantially all objects having distances from said point corresponding to alternate ones of said preselected range intervals.

14. An apparatus in accordance with claim 13 in which said image translation means more specifically comprises:

an electronic image converter having a photosensitive cathode, a control grid and an electron responsive fluorescent anode;

and circuit means electrically connected to said control grid of said electronic image converter for applying a train of voltage pulses to said grid, with said pulses individually having time durations of the order of about 2 to 10 nanoseconds and with said pulses being time spaced apart by time intervals approximately equal to the pulse duration.

15. A method of conducting a topographical survey to compile information concerning the surface irregularities of a terrain comprising the steps of:

moving a vehicle along a predetermined traverse direction at a relatively high elevation above said terrain;

time successively propagating a large plurality of light pulses from said vehicle toward said terrain in a manner to time successively illuminate a large plurality of geographically successive portions of the surface of said terrain with each successive portion being illuminated by a different successive light pulse;

optically collecting, during each interpulse time interval immediately following illumination of a given terrain portion, a portion of the light which is reflected from said terrain portion;

continuously converting said reflected light, on an as received time sequential basis, into two dimensional space-distributed electron images of said terrain portion;

time gating said electron images and preserving a first group of partial images representative of terrain portions having elevations within a plurality of spaced elevation ranges, and discarding a second group of partial images representative of terrain portions having elevation values interstitially intermediate said spaced elevations ranges;

and continuously recording said first group of partial images to generate a contour line representation of the topography of said terrain.

References Cited

UNITED STATES PATENTS

| | | | |
|---|---|---|---|
| 2,616,077 | 10/1952 | Holser. | |
| 2,648,838 | 8/1953 | Raymond | 178—6.8 X |
| 3,019,292 | 1/1962 | John | 178—6.7 |
| 3,078,340 | 2/1963 | Willey. | |
| 3,109,057 | 10/1963 | Slavecki et al. | |
| 3,191,170 | 6/1965 | Lustig et al. | 343—5 |
| 3,242,484 | 3/1966 | Russell. | |
| 3,294,903 | 12/1966 | Goldmark et al. | 178—6.8 |
| 3,296,579 | 1/1967 | Farr et al. | |
| 3,316,348 | 4/1967 | Hufnagel et al. | 178—6.7 |

RONALD L. WIBERT, Primary Examiner

FANNIE L. EVANS, Assistant Examiner

U.S. Cl. X.R.

95—125; 178—7.1, 7.4; 250—227; 350—96